United States Patent
Schmidt

(10) Patent No.: US 6,813,818 B2
(45) Date of Patent: Nov. 9, 2004

(54) METHOD FOR JOINING VEHICLE FRAME COMPONENTS

(75) Inventor: Jim Schmidt, Bonita Springs, FL (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/326,979

(22) Filed: Dec. 24, 2002

(65) Prior Publication Data

US 2004/0155030 A1 Aug. 12, 2004

(51) Int. Cl.[7] .................................................. B23P 17/00
(52) U.S. Cl. ...................... 29/419.2; 219/611; 219/617; 29/897.2; 29/507
(58) Field of Search ............................. 29/419.2, 897.2, 29/432.1, 449, 454, 469.5, 505, 506, 507, 512, 522.1, 508, 518, 520; 219/611, 617, 603; 296/35.1

(56) References Cited

U.S. PATENT DOCUMENTS

| | | | |
|---|---|---|---|
| 3,436,806 A | 4/1969 | Supan | |
| 3,520,049 A | 7/1970 | Lysenko et al. | |
| 4,067,216 A | 1/1978 | Khimenko et al. | |
| 4,504,714 A | 3/1985 | Katzenstein | |
| 4,513,488 A | 4/1985 | Arena | |
| 4,807,351 A | 2/1989 | Berg et al. | |
| 5,800,024 A | 9/1998 | Steimmel et al. | |
| 5,865,362 A | * 2/1999 | Behrmann et al. | ....... 228/114.5 |
| 5,966,813 A | 10/1999 | Durand | |
| 5,981,921 A | 11/1999 | Yablochnikov | |
| 6,255,631 B1 | * 7/2001 | Kichline et al. | ............ 219/617 |
| 6,523,876 B1 | * 2/2003 | Durand | ...................... 296/35.1 |

FOREIGN PATENT DOCUMENTS

| | | |
|---|---|---|
| DE | 198 27 538 A1 | 12/1998 |
| JP | 10-314869 A | 12/1998 |
| JP | 2002-086228 A | 3/2002 |

* cited by examiner

*Primary Examiner*—Peter Vo
*Assistant Examiner*—Stephen Kenny
(74) *Attorney, Agent, or Firm*—Liniak, Berenato & White

(57) ABSTRACT

A method for joining vehicle components together to form a vehicle frame assembly where the components are formed from dissimilar materials such as metallic and non-metallic materials. A composite body mount bracket may be attached to a structural component of a vehicle body and frame assembly by providing a body mount bracket having an opening formed therethrough and by providing a first structural component formed from a metallic material also having an opening formed therethrough. The body mount bracket is then positioned adjacent the first structural component such that the respective openings are aligned with one another. A second structural component formed of a metallic material is then inserted through the aligned openings. Next, the second structural component is welded first structural component through a magnetic pulse welding technique, and lastly, the second structural component is pulse formed or deformed so as to mechanically clamp the body mount bracket thereto.

9 Claims, 4 Drawing Sheets

METHOD FOR JOINING VEHICLE FRAME COMPONENTS

BACKGROUND OF THE INVENTION

1. Field of the Invention

This invention relates in general to vehicular body and frame assemblies and in particular to a method for joining together vehicle components, especially those manufactured from dissimilar materials, to form such a vehicle body and frame assembly.

2. Background of the Invention

Many land vehicles in common use, such as automobiles, vans, and trucks, include a body and frame assembly which is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit which is resiliently supported upon the vehicle wheels by the suspension system. Unitized body and frame assemblies of this general type are found in many relatively small modem vehicles, such as automobiles and minivans.

Each of these body and frame assemblies is composed of a plurality of individual vehicle frame components that are secured together. In the past, virtually all of these vehicle frame components have been manufactured from a metallic material. Steel has traditionally been the preferred material for manufacturing all of such vehicle frame components because of its relatively high strength, relatively low cost, and ease of manufacture. Vehicle frame components manufactured from metallic materials have been secured together by conventional welding techniques. More recently, however, in an effort to reduce the weight, noise and vibration of the vehicle frame assembly, it has been found desirable to use alternative materials to form some or all of the vehicle frame components. Thus, in some instances, it may be desirable to form some or all of the vehicle frame components from materials which cannot be easily secured together, or in some cases cannot be secured together at all by conventional welding techniques. For example, conventional welding techniques cannot be used to secure a metallic vehicle frame component to a non-metallic vehicle frame component.

Thus, it would be desirable to provide a method for joining vehicle components together to form a vehicle body and frame assembly, where the components are formed from alternative materials, and particularly those components manufactured from dissimilar materials, such as metallic and non-metallic materials.

SUMMARY OF THE INVENTION

The present invention described herein provides a method for joining vehicle components together to form a vehicle body and frame assembly, where the components are formed from alternative materials, and particularly those components manufactured from dissimilar materials, such as metallic and non-metallic materials.

For example, use of non-metallic components within the vehicle frame will reduce weight, noise and vibration of the frame structure. In light thereof, the present invention provides non-metallic; e.g., composite components, within the vehicle frame assembly.

The above object as well as other objects not specifically enumerated are achieved by a method of joining vehicle frame components made from dissimilar materials, where the method includes interlocking a non-metallic mount with at least one metallic rail and cross member using a magnetic pulse welding technique.

For example, a body mount bracket may be attached to a structural component of a vehicle body and frame assembly by providing a body mount bracket formed from composite or other non-metallic material and having an opening formed therethrough and by providing a first structural component formed from a metallic material also having an opening formed therethrough. The body mount bracket is then positioned adjacent the first structural component such that the respective openings are aligned with one another. A second structural component formed of a metallic material is then inserted through the aligned openings. Next, the second structural component is welded first structural component through a magnetic pulse welding technique, and lastly, the second structural component is pulse formed or deformed so as to mechanically clamp the body mount bracket thereto.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
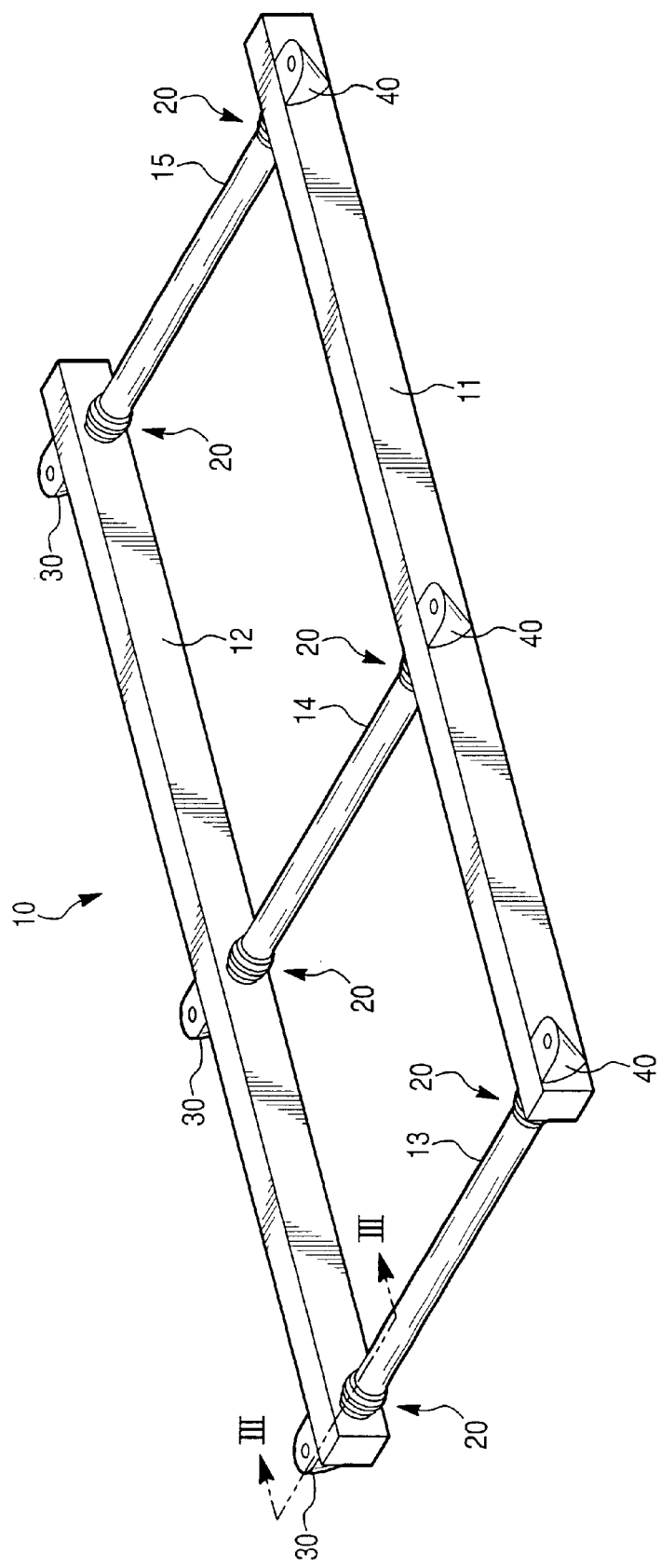
FIG. 1 is a schematic perspective exploded view of a vehicle body and frame assembly manufactured in accordance with the method of this invention.
Figure 2:
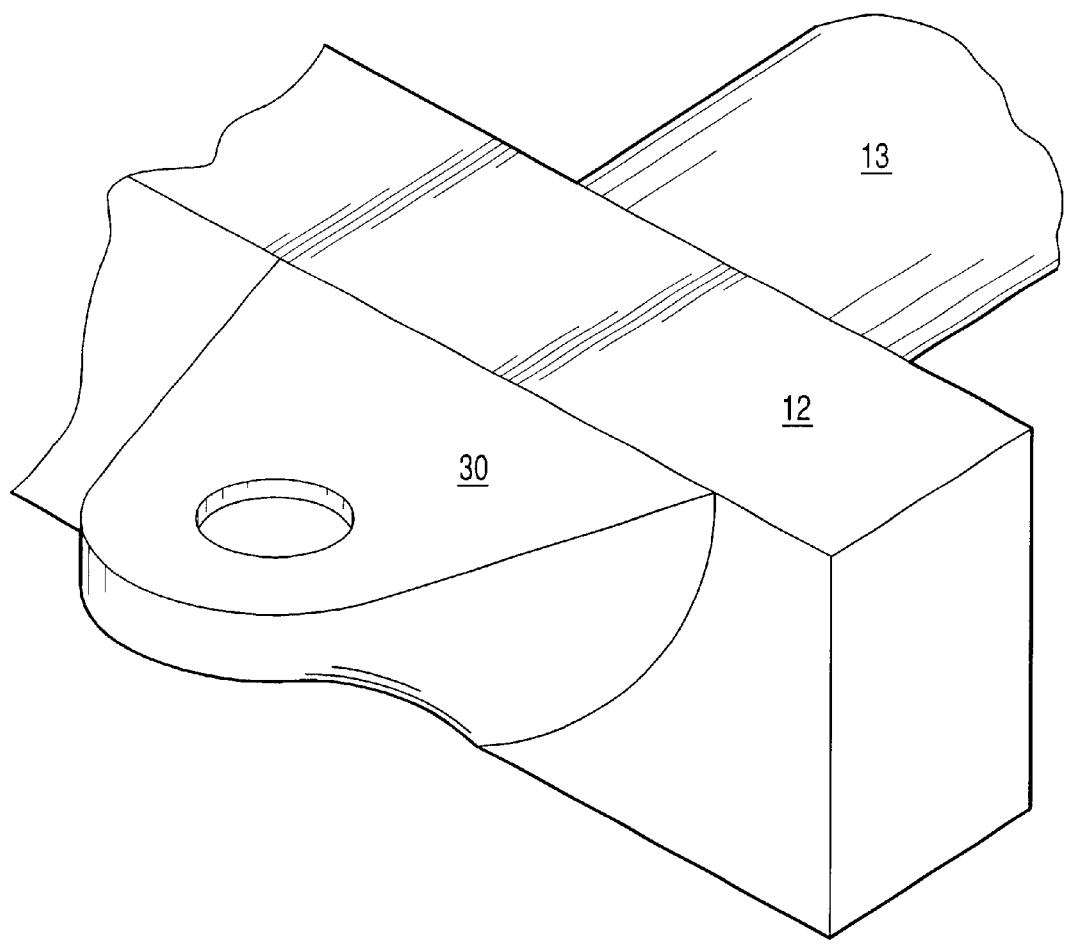
FIG. 2 is an enlarged partial view of the body mount bracket, side rail and cross member manufactured according to the present invention.

Referring now to the drawings, there is schematically illustrated in FIG. 1 a vehicle body and frame assembly, indicated generally at 10, that has been manufactured in accordance with the method of this invention. The illustrated vehicle body and frame assembly 10 is a ladder frame assembly. However, it will be appreciated that the method of this invention may be utilized in the manufacture of any type of vehicle body and frame assembly, such as a unitized body and frame assembly where the structural components of the body portion and the frame portion are combined into an integral unit.

The illustrated ladder frame assembly 10 includes a pair of longitudinally extending side rails 11 and 12 having a plurality of transverse cross members 13, 14, and 15 extending therebetween. The side rails 11 and 12 extend longitudinally along the length of the assembly 10 and are generally parallel to one another. The illustrated side rails 11 and 12 may be formed from single members that extend along the entire length of the assembly 10, as shown, while in other vehicle body and frame assembly designs the side rails 11 and 12 might extend for only a portion of the length of the frame assembly 10. The side rails 11 and 12 can be formed having any desired structure, as is well known to those skilled in the art and may be formed from any desired material. In the preferred embodiment, the side rails 11, 12 are formed of steel.

The cross members 13, 14, and 15 extend generally perpendicular to the side rails 11 and 12. The cross members 13, 14, and 15 are spaced apart from one another along the length of the assembly 10. The cross members 13, 14, and 15 are secured to the side rails 11 and 12 at a joint, indicated generally at 20, in accordance with the method of this invention, as described below. When secured to the side rails 11 and 12, the cross members 13, 14, and 15 provide desired rigidity to the assembly 10. Although three cross members 13, 14, and 15 are shown in FIG. 1, it will be appreciated that a greater or lesser number of such cross members may be provided. The cross members 13, 14, and 15 can be formed having any desired structure and may be formed from any desired material. In the preferred embodiment, the cross members 13, 14, 15 are formed of aluminum.

In the illustrated embodiment, both the side rails 11 and 12 and the cross members 13, 14, and 15 are shown as closed channel structures, although the method of the invention can be used with channel structures of other configurations. Closed channel structural members can be characterized as having a continuous cross sectional shape, such as tubular or box-shaped channel members, for example. In contrast, open channel structural members can be characterized as having a non-continuous cross sectional shape, such as C-shaped or hat-shaped channel members, for example. Such open channel structural members are relatively easy and inexpensive to shape into desired configurations and to secure together. Closed channel structural members are desirable because they are generally stronger and more rigid than open channel structural members of comparable weight.

In addition to the side rails 11, 12 and the cross members 13, 14, 15, the present invention comprises a series of composite body cab mount brackets 30, 40. The composite mount brackets 30, 40 are generally disposed at the terminal ends of the cross members 13, 14, 15 on the outside of the side rails 11, 12. Thus, the composite mount brackets 30, 40 are symmetrically disposed outside the side rails 11, 12 and aligned with the cross members 13, 14, 15.

In a preferred embodiment of this invention, one of the two vehicle frame components, for example one of the cross members 13, 14, or 15, to be joined together at a joint 20, is made from a non-metallic material, while the other component, for example a side rail 11 or 12, is made from a metallic material. Thus, the illustrated joint 20 connects a metallic frame component to a non-metallic component. However, the method of this invention is equally suitable to form a joint 20 between two frame components made from any two dissimilar materials, even where the two dissimilar materials are generally not joinable by conventional techniques. As such, the inventive method may be used to join two frame components made from dissimilar metals or to join two frame components made from one metallic material and another, different non-metallic (or non-weldable) material.

Figure 3:
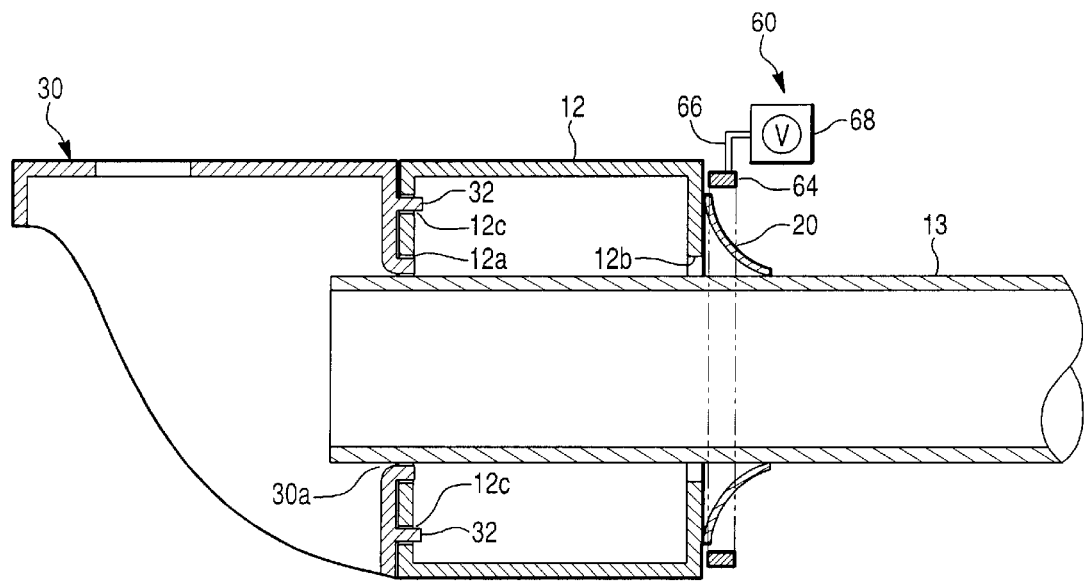
FIG. 3 is an enlarged cross-sectional view of a portion of the vehicle body mount bracket, side rail and cross member assembly illustrated in FIG. 1 prior to the magnetic welding operation.
Figure 4:
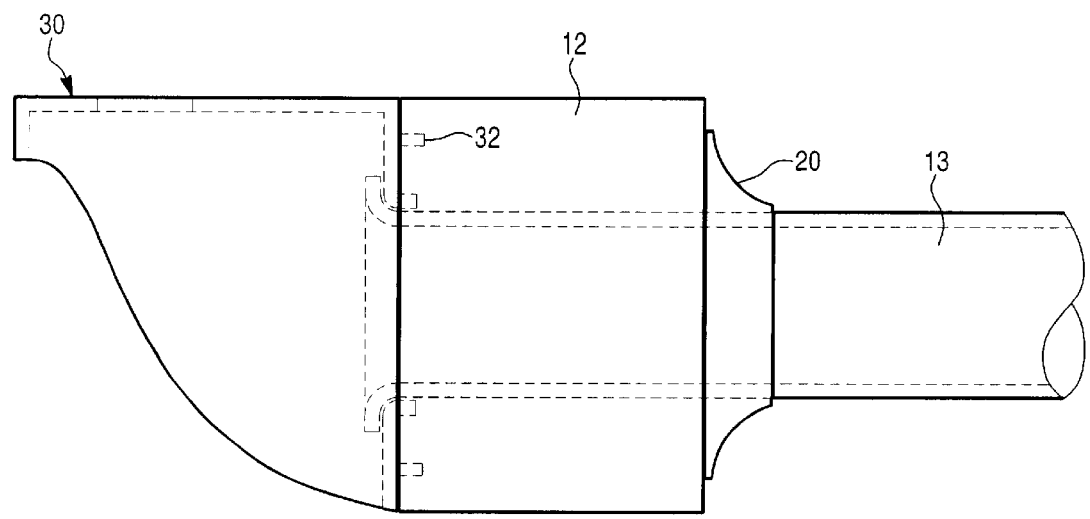
FIG. 4 is an enlarged cross-sectional view of a portion of the vehicle body mount bracket, side rail and cross member assembly illustrated in FIG. 1 showing the welded components after the magnetic welding operation.

The method for joining two vehicle frame components made from dissimilar materials in accordance with this invention is shown in FIGS. 3, 4 and 5. In a first step of the method shown in FIG. 3, a metallic side rail 12, a metallic cross member 13 and a non-metallic mount bracket 30 are provided. In the illustrated embodiment, both the side rail 12 and the cross member 13 are shown as closed channel structures, although such is not required. Metallic materials suitable for use in a vehicle frame component include, but are not limited to, steel, aluminum, magnesium, and alloys thereof. Non-metallic material suitable for use in a vehicle frame component include, but are not limited to plastics, layered composites, fiber matrix composites (such as an arimid/glass/carbon composite), or combinations thereof. Other non-metallic materials include reinforced inorganic composite materials and laminate materials. For purposes of this invention, all of these non-metallic materials are referred to as "composite materials".

The side rail 12 includes an apertures 12a, 12b sized to receive the cross member 13 passing therethrough. The side rail 12 also includes alignment holes 12c on its outside surface.

The mount bracket 30 is formed with an aperture 30a sized to receive the cross member 13 and locating tangs 32. The locating tangs 32 are formed and arranged to be disposed within the alignment holes 12c to properly locate the mount bracket relative to the side rail 12.

As shown in FIGS. 3 and 4, the mount bracket 30 is positioned next to the outside of the side rail 12 with the aperture 32 aligned with the aperture 12a and the locating tangs 32 positioned within the alignment holes 12c. The cross member 13 is passed through the apertures 12a, 12b in the side rail and into the aperture 32 in the mount bracket 30.

A metallic flange 20 is also disposed at the inner side of the side rail 12 around the cross member 13 as shown in FIG. 3.

Next, a perimeter reduction device, such as magnetic pulse welding apparatus indicated generally at 60, is disposed around and adjacent the metallic flange 20 at the intersection of the apertures 12a and the cross member 13. The magnetic pulse welding apparatus 60 includes leads or terminals 66 that connect a source of power 68 to the inductor coil 64. The electromagnetic pulse apparatus 60 is adapted to generate an intense, momentary magnetic field on a localized portion of the metallic flange 20. The intense magnetic field applied at a localized area creates inwardly directed forces which cause the metallic flange to collapse inwardly at that area, thereby reducing its size until it intimately contacts the cross member 13 and side rail 12 and is magnetically pulse welded to the intersection of the cross member 13 and side rail 12. The contact of the two members at high velocities from appropriately defined initial geometry causes the two members 12, 13 to be welded together.

The magnetic pulse welding apparatus 60 includes one or more high voltage capacitors (not shown) and a discharge circuit (not shown) that is suitable for conducting a momentary current of sufficient magnitude. The central components of a magnetic pulse welding apparatus are its capacitor bank, inductor and high current switching device. The current required to successfully deform and weld on a hollow metallic member used in a vehicle axle component, such as the flange 20, may exceed one million amps, and will vary with the charge voltage of the power supply of 60, materials selected for components of the frame assembly and flange 20 and gauge thickness. The discharge circuit and the capacitors operate to supply an energy spike or surge to the inductor coil 64. The inductor coil 64 creates a strong magnetic field that exerts a force against the outer surface of the flange member 20. The effect of the intense, momentary magnetic field on the metallic band 36 is to create an extremely powerful force that repels or drives flange member 20 radially inwardly away from the inductor coils 62 and 64. The magnetic field created by the pulse of current through the inductor coil 64 creates strong reactive eddy currents in the metallic flange 20. The eddy currents create opposing magnetic fields that result in inwardly directed forces on the metallic flange 20. These forces cause the flange 20 to collapse about a localized area, reducing its size until it contacts the cross member 13 and the side rail 12, thereby welding and also crimping or clinching the flange 20.

In an alternative embodiment, a multi turn coil, not shown, is provided for the magnetic pulse welding step. This multi turn coil is adapted to provide electromagnetic fields of variable strengths across the width of the flange 20.

Figure 5A:
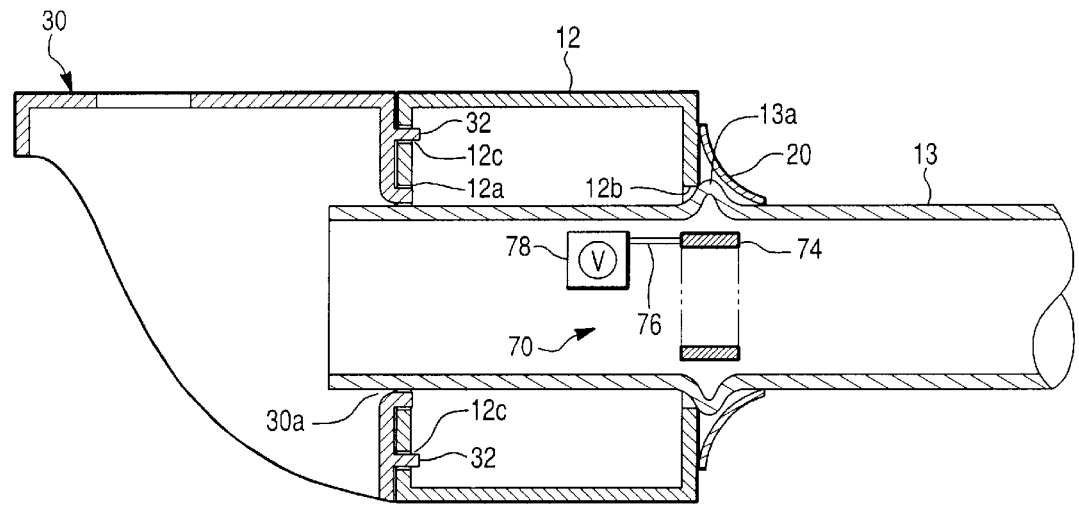
FIGS. 5a and 5b are enlarged cross-sectional views of the portion shown in FIG. 4 also schematically showing the magnetic pulse forming step performed at the intersection of the cross member and side rail and at the end of the cross member.

FIG. 5a shows an alternate method of pulse welding the cross member 13 to the side rail 12. As shown in FIG. 5a, the magnetic pulse deforming apparatus indicated generally at 70, is disposed within the end 13a of the cross member 13 and is inserted to a point adjacent and inside the intersection of the cross member 13 and side rail 12. The magnetic pulse welding apparatus 70 includes leads or terminals 76 that connect a source of power 78 to the inductor coil 74. The electromagnetic pulse apparatus 70 is adapted to generate an intense, momentary magnetic field on a localized portion of the cross member 13. The intense magnetic field applied at a localized area creates outwardly directed forces which cause the portion 13a to expand outwardly at that area as shown in FIG. 5a, thereby increasing its size or bulging out the portion 13a until it intimately interlocks the cross member 13 with the side rail 12.

Figure 5B:
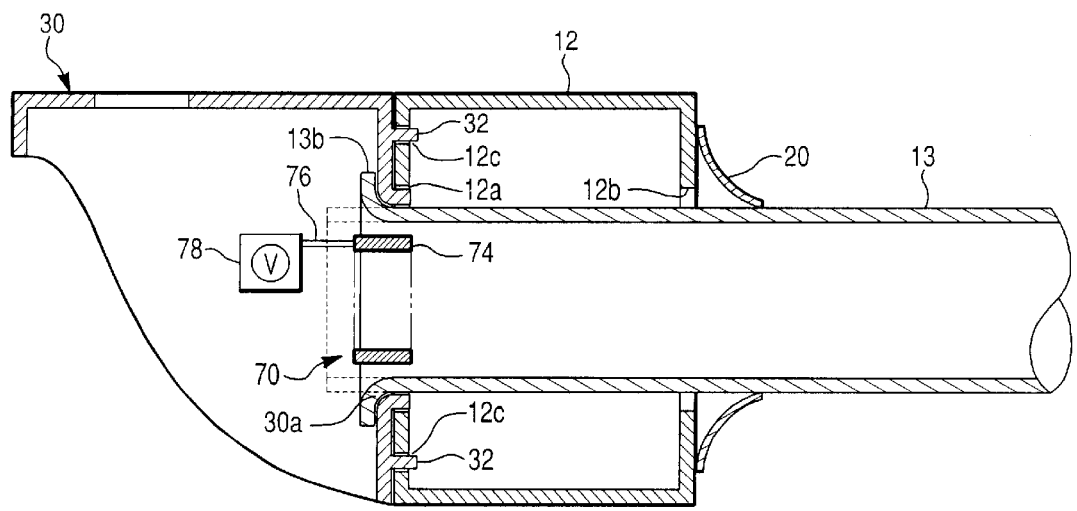

The last step of this invention is shown with respect to FIG. 5b. In the last step, the metal cross member 13 is pulse formed or deformed so as to mechanically clamp the body mount bracket 30 to the side rail 12. More specifically, a magnetic pulse deforming apparatus indicated generally at 70, is disposed within and adjacent the end 13b of the cross member 13. The magnetic pulse welding apparatus 70 includes leads or terminals 76 that connect a source of power 78 to the inductor coil 74. The electromagnetic pulse apparatus 70 is adapted to generate an intense, momentary magnetic field on a localized portion of the end 13b of the cross member 13. The intense magnetic field applied at a localized area creates outwardly directed forces which cause the end 13a to expand outwardly at that area as shown in FIG. 5, thereby increasing its size or flaring out the end 13b until it intimately contacts the body mount bracket 30; thereby clamping the bracket 30 against the side rail 12.

As a result of the step shown in FIG. 5, the body mount bracket 30 is magnetically pulse formed or deformed toward the side rail 12 and the bracket 30 is locked in place against the side rail 12 by virtue of the interconnection of the cross member 13, side rail 12 and bracket 30 as shown in FIG. 4.

From the foregoing description, it is apparent that the present invention provides a method of joining vehicle frame components made from dissimilar materials, where the method includes interlocking a non-metallic mount with at least one metallic rail and cross member using a magnetic pulse welding technique.

The principle and mode of operation of this invention have been described in its preferred embodiments. However, it should be noted that this invention may be practiced otherwise than as specifically illustrated and described without departing from its scope.

What is claimed is:

1. A method of joining a plurality of vehicle frame components made from similar and/or dissimilar materials, the method comprising the steps of:
   a. providing a side rail component;
   b. providing a cross member component, wherein at least one of the side rail and cross member components is made from a metallic material;
   c. positioning a bracket member adjacent the first side rail;
   d. positioning a portion of the cross member component through an aperture in the side rail and within a portion of the bracket member;
   e. affixing said cross member component to said side rail component;
   f. providing an inductor at a terminal end of the cross member component;
   g. energizing the inductor to generate a magnetic field and to magnetic pulse form the terminal end of the cross member component, thereby expanding the terminal end and clamping the bracket member to the side rail component.

2. The method of claim 1, where the step of affixing the cross member component to the side rail component comprises the steps of providing said inductor inside the cross member component adjacent the side rail component, and energizing the inductor to generate a magnetic field for expanding a portion of the cross member component at the side rail component and to magnetically pulse deform the cross member component, thereby affixing the cross member component to the side rail component.

3. The method of claim 1, where the step of affixing the cross member component to the side rail component comprises the steps of disposing a metallic band around the cross member component at an intersection with the side rail component; providing said inductor around the metallic band; and energizing the inductor to generate a magnetic field for collapsing the metallic band about the intersection and to magnetically pulse weld the metallic band at the intersection, thereby affixing the cross member component to the side rail component.

4. The method of claim 1, wherein the bracket member is formed of a non-metallic composite material to reduce at least one of weight, noise and vibration of said bracket member.

5. The method of claim 1, wherein the cross member component is formed of aluminum.

6. The method of claim 1, wherein the side rail component is made of a metallic material.

7. The method of claim 1, wherein a cross member component passes completely through a pair of aligned apertures on said side rail component.

8. The method of claim 1, wherein the bracket member is formed with positioning tangs and the side rail component is formed with alignment holes, wherein said positioning tangs are disposed within said alignment holes for positioning said bracket member relative to said side rail component.

9. The method of claim 1, wherein the step of providing said inductor at said terminal end comprises positioning said inductor within an open end of said cross member component.

* * * * *